March 12, 1957     J. F. PUNZAK     2,785,276
HEATING UNIT FOR PERCOLATOR

Filed May 13, 1954     2 Sheets-Sheet 1

INVENTOR
JOSEPH F. PUNZAK

BY Fisher & Christen,
ATTORNEYS.

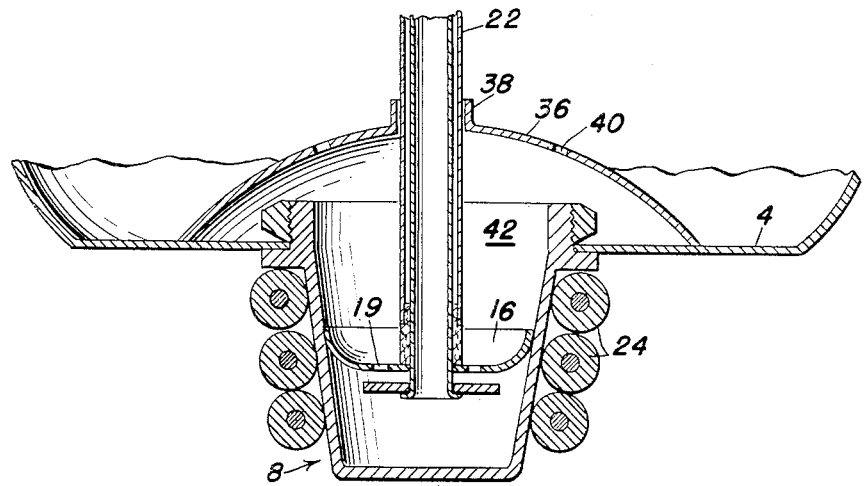
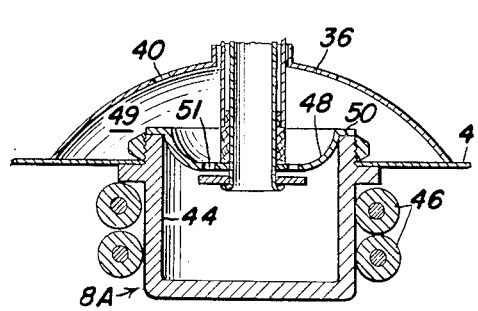
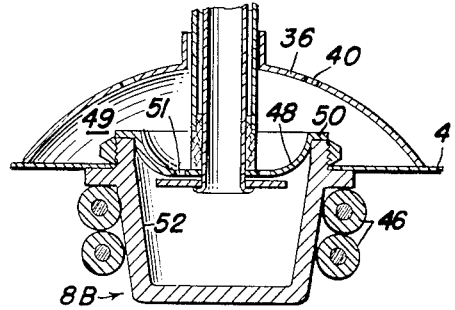
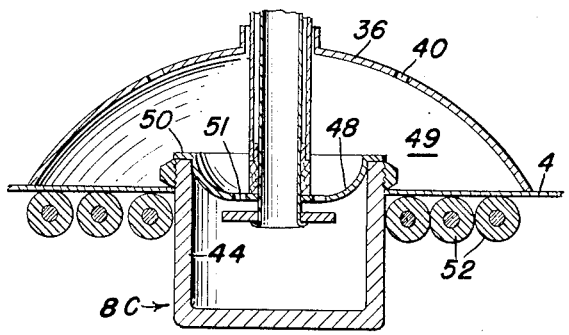

United States Patent Office 2,785,276
Patented Mar. 12, 1957

2,785,276
HEATING UNIT FOR PERCOLATOR

Joseph F. Punzak, Brooklyn, N. Y., assignor to United Metal Goods Manufacturing Co., Inc., Brooklyn, N. Y., a corporation of New York Application May 13, 1954, Serial No. 429,508

1 Claim. (Cl. 219—44)

This invention is a heating unit for a percolator of the instantaneous type.

The principal object of the invention is to provide a heating unit comprising a preheating zone where water from the body of the percolator is preliminarily heated, such heated water then passing into a vaporizing chamber where it is vaporized to send a mixture of steam and water up the usual fountain tube to the top of the percolator.

The vaporizing chamber is heated by a coil capable of handling a heavy current; the capacity of the vaporizing chamber is relatively small, so that the small amount of water in the vaporizing chamber is heated quickly and percolation starts in a fraction of a minute, long before the body of cool water in the body of the percolator is heated to approximately boiling.

The heating unit of this invention, comprising the preheater and the vaporizing chamber, is insulated from the body of cool water in the body of the percolator.

The fountain tube of this invention is also insulated, being made preferably of two concentric tubes with a space between them, which space may be an air space or may be filled with insulating material, such as asbestos, or the like, for preventing condensation within the fountain tube where it passes upward through the cooler water in the percolator. This keeps the temperature of the water which is being pumped upward high enough to extract the coffee flavors as quickly as possible.

The fountain tube of this invention is supported with its lower end well down in the vaporizing chamber. This may be done in several ways, either by providing a cup having a perforated bottom, said cup having outwardly extending portions which engage with the top peripheral edge of the vaporizing chamber, the water within and above the cup being preliminarily heated, then dripping through the perforated bottom into the vaporizing chamber, where it is vaporized, vapor and hot water passing upwardly through the fountain tube to the top of the percolator. The described cup may have an out-turned flange, or it may be conical with upwardly divergent walls for support by the top peripheral edge of the vaporizing chamber.

In another aspect of the invention, the walls of the vaporizing chamber may be conical and diverge upwardly so that the cup with the perforated bottom is supported by said conical wall of the vaporizing chamber.

The heating unit also comprises a downwardly and outwardly flared dome, positioned just above the vaporizing chamber, for defining a preheating chamber beneath said dome between the dome and the bottom of the percolator. This dome is of metal or of some insulating material, such as a suitable plastic or other material which is not a good heat conductor. This dome defines therebeneath a preheating zone and insulates the heating unit from the cooler water in the body of the percolator.

Instead of using a dome above the vaporizing chamber, as just described, there may be used a perforated washer or baffle, positioned just above the vaporizing chamber and preferably loosely mounted on the fountain tube, this washer or baffle defining a preheating zone just below it, the washer feeding limited amounts of water through its perforations into such preheating zone.

Further advantages of construction and operation will be described in connection with the accompanying drawings wherein:

Fig. 3 is a similar view showing a modified construction;

Figs. 4, 5 and 6 are similar views showing other modified constructions.

Figure 1:
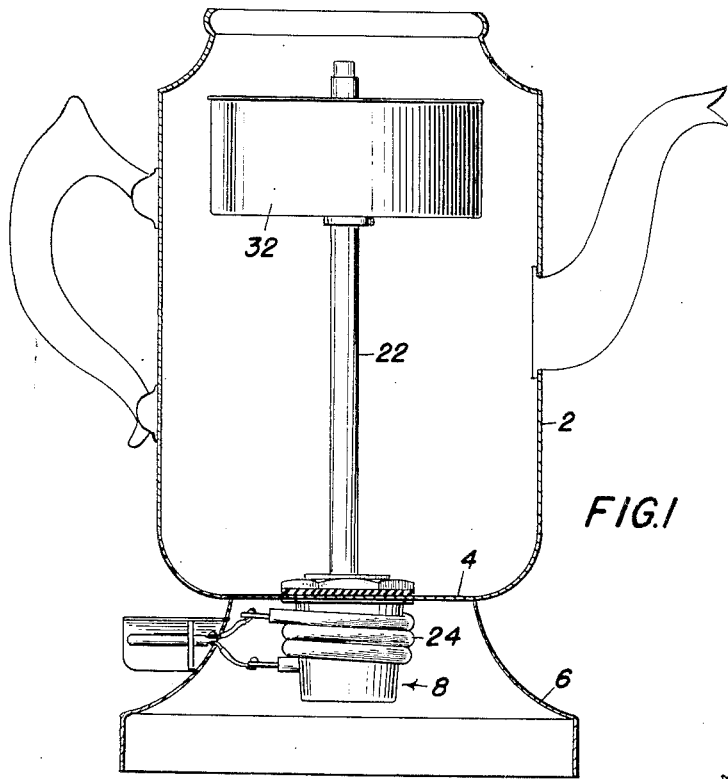
Fig. 1 is a side view partly in section of a coffee percolator utilizing the heating unit of this invention.

Referring now to these drawings, the coffee percolator 2 comprises the bottom wall 4 and base 6 containing the heating unit, indicated generally at 8, of the present invention. The heating unit 8, Fig. 2, comprises an open topped vaporizing chamber having upwardly diverging walls 10 substantially in the shape of the frustum of a cone. The upper part of chamber 8 projects through the bottom 4 of the percolator and is held in place between a flange 12 and a threaded collar 14 which engages with suitable threads at the upper part 15 of heater 8.

Figure 2:
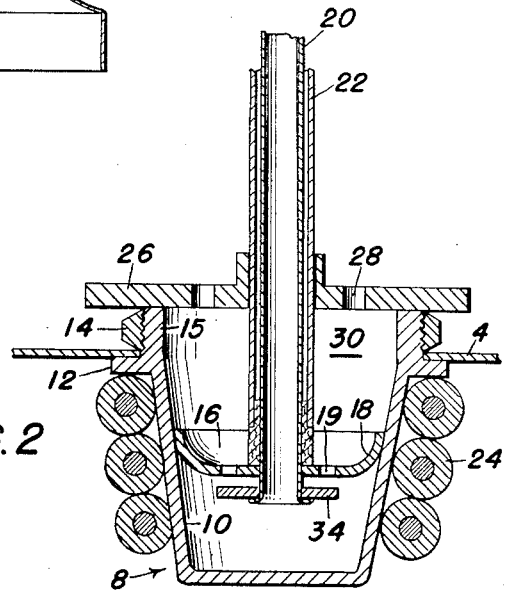
Fig. 2 is a central vertical sectional view of the heating unit of Fig. 1 on a larger scale.

Positioned within the heater 8 is a cup member 16 provided with curved, outwardly and upwardly flared walls 18, of a size to engage against the conical wall 10 to position the cup approximately half way down in the heater 8, as shown in Fig. 2. Attached to the cup 16 is a double walled fountain tube comprising an inner tube 20 and an outer tube 22; these tubes are concentric and spaced apart to define an air space between them, which space may remain an air space or may be filled with a suitable insulating material.

The vaporizing chamber 8 is surrounded by a conventional heating coil 24 of a type to handle a heavy current of the order of 500 to 1000 watts. The usual thermostatic controls may be used for high or low heat, as is customary in this art.

Positioned on the fountain tube is a baffle or washer 26 adapted to rest on the upper edge of the vaporizing chamber 8, this washer being provided with one or more apertures 28 for admitting limited quantities of cool water to the vaporizing chamber. This baffle 26 may be loose on tube 22, or fixed thereto.

The cup 16 and the washer or baffle 26 define between them a preheating zone 30, in which the cool water entering such zone through holes 28 is preliminarily heated, thereafter passing through holes 19 in the cup 16 to the bottom of the vaporizing chamber, the water being vaporized and the vapor pressure sending the mixture of water and steam up the fountain tube to the usual upper unit 32 of the percolator for containing ground coffee or the like.

The action just described is usually intermittent, due to the fact that the inner tube 20 is extended below cup 18 and is flared outwardly to support a disk valve 34, which is moved up and down intermittently by vapor pressure to periodically open and close apertures 19.

Fig. 3 shows an alternative construction, comprising a downwardly and outwardly flared baffle or dome 36 provided with an annular collar 38 surrounding tube 22 and, if desired, with one or more water admitting holes 40. The baffle or dome 36 defines between it and cup 16 a preheating zone 42. Limited amounts of cool water pass through holes 40 into the preliminary heating zone 42, being thereby preliminarily heated as before, then passing through the holes in the cup 16 into the hot bottom part of the vaporizing chamber 8 and thence up the fountain tube.

In the form of the invention shown in Fig. 4, the vaporizing chamber 8A is provided with vertical walls 44 surrounded by the usual heating coils 46. The cup member 48 is provided with an outwardly flared portion 50 which engages with and is supported by the upper peripheral edge of chamber 8A. A baffle or dome 36 defines a preheating zone 49 between it and cup 48, the preliminarily heated water then passing through the holes 51 in cup 48 and then down into the hot bottom portion of the chamber and is pumped upwardly by vapor pressure through the fountain tube as before.

In the form of the invention shown in Fig. 5, the vaporizing chamber 8B is provided with outwardly diverging walls 52. A cup member 48 and baffle or dome 36 are provided as before to define a preliminary heating zone 49.

In the form of the invention shown in Fig. 6, the vaporizing chamber 8C is provided with vertical walls 44, cup member 48, baffle or dome 36 and other parts as in Fig. 4, the heating coil 52 in Fig. 6 surrounding the heating chamber in the form of a spiral being soldered to the underside of the bottom 4 of the percolator for thereby transmitting a substantial amount of heat to the preliminary heaing zone 49 between the baffle or dome 36 and the cup 48. The operation otherwise is as already described. The horizontal or flat form of heating coil shown in Fig. 6 could be used with any of the other forms of the invention, if desired.

The several vaporizing chambers are preferably circular in horizontal cross-section.

While the preferred embodiments of the invention have been described in some detail, it should be understood that the invention is not to be limited to the precise details shown, but may be carried out in other ways.

I claim as my invention:

A heating unit for a percolator of the instantaneous type, comprising a heating chamber having an upwardly flared wall, a resistance heater coiled around the outside wall of said heating chamber, an apertured cup member having an outwardly and upwardly flared periphery adapted to engage against and be supported by and against an intermediate portion of the inner wall of the heating chamber, to define a preheating chamber thereabove, a fountain tube secured to and supported by said cup member, a washer loosely positioned on the lower end of said fountain tube, below said cup member, and a dome shaped baffle member whose upper portion is carried by said fountain tube and having its lower edge in contact with the bottom of the percolator, and provided with water admitting apertures, for screening the preheating chamber from the body of cool water in the percolator and for admitting water in limited amounts through said apertures to said preheating chamber.

References Cited in the file of this patent
UNITED STATES PATENTS

| | | |
|---|---|---|
| 913,293 | Holley | Feb. 23, 1909 |
| 1,007,725 | Nelson | Nov. 7, 1911 |
| 1,008,267 | Holley | Nov. 7, 1911 |
| 1,452,256 | Rowley | Apr. 17, 1923 |
| 1,475,334 | Warner | Nov. 27, 1923 |
| 1,782,958 | Dym | Nov. 25, 1930 |
| 2,107,924 | Adams | Feb. 8, 1938 |
| 2,213,723 | Smith | Sept. 3, 1940 |
| 2,531,180 | Weeks | Nov. 21, 1950 |